United States Patent
Sales et al.

(10) Patent No.: US 6,868,496 B2
(45) Date of Patent: Mar. 15, 2005

(54) HOST PROTECTED AREA (HPA) DUPLICATION PROCESS

(75) Inventors: Alan Sales, Sioux City, IA (US); Mike Jaskowiak, Sioux City, IA (US); Roger Widner, Vermillion, SD (US)

(73) Assignee: Gateway, Inc., North Sioux City, SD (US)

( * ) Notice: Subject to any disclaimer, the term of this patent is extended or adjusted under 35 U.S.C. 154(b) by 792 days.

(21) Appl. No.: 09/866,332

(22) Filed: May 25, 2001

(65) Prior Publication Data

US 2002/0133714 A1 Sep. 19, 2002

Related U.S. Application Data

(60) Provisional application No. 60/262,123, filed on Jan. 16, 2001.

(51) Int. Cl.[7] ................................................. H04L 9/00
(52) U.S. Cl. ........................ 713/193; 713/200; 713/201
(58) Field of Search ................................. 713/193, 200, 713/201

(56) References Cited

U.S. PATENT DOCUMENTS

| | | | | |
|---|---|---|---|---|
| 5,878,380 A | * | 3/1999 | Hollandsworth | ............ 702/159 |
| 5,907,679 A | | 5/1999 | Hoang et al. | ............ 395/200.5 |
| 5,966,732 A | | 10/1999 | Assaf | ......................... 711/170 |
| 5,973,964 A | * | 10/1999 | Tobita et al. | .......... 365/185.29 |
| 5,974,567 A | | 10/1999 | Dickson, Jr. et al. | ......... 714/27 |
| 6,000,023 A | | 12/1999 | Jeon | ........................... 711/173 |
| 6,104,555 A | | 8/2000 | Nam | |
| 6,105,026 A | | 8/2000 | Kruglikov et al. | ............. 707/8 |
| 6,108,147 A | | 8/2000 | Jeon | |
| 6,108,759 A | | 8/2000 | Orcutt et al. | ............... 711/173 |
| 6,131,141 A | | 10/2000 | Ravid | |
| 6,154,835 A | | 11/2000 | Chrabaszcz et al. | ........... 713/1 |

FOREIGN PATENT DOCUMENTS

| | | |
|---|---|---|
| EP | 0913763 | 5/1999 |
| GB | 2345361 | 12/1999 |
| JP | 10207638 | 7/2000 |

OTHER PUBLICATIONS

Information Technology—Protected Area Run Time Interface Extension Services; Curtis E. Stevens; Apr. 5, 2000.

* cited by examiner

*Primary Examiner*—Thomas R. Peeso

(57) ABSTRACT

The content of a hard disk drive or the like information storage media that includes content stored in a host protected area (HPA) or reserve area of the hard disk is duplicated using hard disk drive duplicating machinery. The duplication process includes the steps of detecting the presence of a HPA on a source drive, and if detected, generating an HPA are of the same or of a sufficiently accommodating size on the target disk drive. Information from the source HPA drive to the thus created HPA area of the target-drive. The remaining content from the source drive is written to an available section of the target drive. The invention is thereby able to detect whether a source drive has a HPA, create an HPA on the target drive, and to copy the content of the source HPA to the HPA on the target device to ensure a proper duplication of the target drive.

54 Claims, 11 Drawing Sheets

| COMMAND BLOCK OUTPUT REGISTERS | | | | | | | | |
|---|---|---|---|---|---|---|---|---|
| REGISTER | 7 | 6 | 5 | 4 | 3 | 2 | 1 | 0 |
| DATA | - | - | - | - | - | - | - | - |
| FEATURE | - | - | - | - | - | - | - | - |
| SECTOR COUNT | - | - | - | - | - | - | - | - |
| SECTOR NUMBER | - | - | - | - | - | - | - | - |
| CYLINDER LOW | - | - | - | - | - | - | - | - |
| CYLINDER HIGH | - | - | - | - | - | - | - | - |
| DEVICE/HEAD | 1 | L | 1 | D | - | - | - | - |
| COMMAND | 1 | 1 | 1 | 1 | 1 | 0 | 0 | 0 |

FIG. 7

| COMMAND BLOCK INPUT REGISTERS | | | | | | | | |
|---|---|---|---|---|---|---|---|---|
| REGISTER | 7 | 6 | 5 | 4 | 3 | 2 | 1 | 0 |
| DATA | - | - | - | - | - | - | - | - |
| ERROR | | | | | | | | |
| SECTOR COUNT | - | - | - | - | - | - | - | - |
| SECTOR NUMBER | V | V | V | V | V | V | V | V |
| CYLINDER LOW | V | V | V | V | V | V | V | V |
| CYLINDER HIGH | V | V | V | V | V | V | V | V |
| DEVICE/HEAD | - | - | - | - | H | H | H | H |
| STATUS | | | | | | | | |

FIG. 8

| ERROR REGISTER ||||||||
|---|---|---|---|---|---|---|---|
| 7 | 6 | 5 | 4 | 3 | 2 | 1 | 0 |
| BBK | UNC | 0 | IDN | 0 | ABT | TON | AMN |
| 0 | 0 | 0 | 0 | 0 | V | 0 | 0 |

FIG. 9

| STATUS REGISTER ||||||||
|---|---|---|---|---|---|---|---|
| 7 | 6 | 5 | 4 | 3 | 2 | 1 | 0 |
| BSY | RDY | DWF | DSC | DRQ | COR | IDX | ERR |
| 0 | V | 0 | - | - | 0 | - | V |

FIG. 10

| COMMAND BLOCK OUTPUT REGISTERS |||||||||
|---|---|---|---|---|---|---|---|---|
| REGISTER | 7 | 6 | 5 | 4 | 3 | 2 | 1 | 0 |
| DATA | - | - | - | - | - | - | - | - |
| FEATURE | - | - | - | - | - | - | - | - |
| SECTOR COUNT | - | - | - | - | - | - | - | B |
| SECTOR NUMBER | V | V | V | V | V | V | V | V |
| CYLINDER LOW | V | V | V | V | V | V | V | V |
| CYLINDER HIGH | V | V | V | V | V | V | V | V |
| DEVICE/HEAD | 1 | L | 1 | D | V | V | V | V |
| COMMAND | 1 | 1 | 1 | 1 | 1 | 0 | 0 | 1 |

FIG. 11

| COMMAND BLOCK INPUT REGISTERS | | | | | | | | |
|---|---|---|---|---|---|---|---|---|
| REGISTER | 7 | 6 | 5 | 4 | 3 | 2 | 1 | 0 |
| DATA | - | - | - | - | - | - | - | - |
| ERROR | | | | | | | | |
| SECTOR COUNT | - | - | - | - | - | - | - | - |
| SECTOR NUMBER | V | V | V | V | V | V | V | V |
| CYLINDER LOW | V | V | V | V | V | V | V | V |
| CYLINDER HIGH | V | V | V | V | V | V | V | V |
| DEVICE/HEAD | - | - | - | - | H | H | H | H |
| STATUS | | | | | | | | |

FIG. 12

| ERROR REGISTER | | | | | | | |
|---|---|---|---|---|---|---|---|
| 7 | 6 | 5 | 4 | 3 | 2 | 1 | 0 |
| BBK | UNC | 0 | IDN | 0 | ABT | TON | AMN |
| 0 | 0 | 0 | 0 | 0 | V | 0 | 0 |

FIG. 13

| STATUS REGISTER | | | | | | | |
|---|---|---|---|---|---|---|---|
| 7 | 6 | 5 | 4 | 3 | 2 | 1 | 0 |
| BSY | RDY | DWF | DSC | DRQ | COR | IDX | ERR |
| 0 | V | 0 | - | - | 0 | - | V |

FIG. 14

HOST PROTECTED AREA (HPA) DUPLICATION PROCESS

CROSS REFERENCE TO RELATED APPLICATIONS

The present application claims priority under 35 U.S.C. §119(e) of United States Provisional Patent Application, titled "Host Protected Area Drive Duplication Process", filed Jan. 16, 2001, Application No. 60/262,123, which is herein incorporated by reference in its entirety. The present application also incorporates U.S. Pat. No. 5,966,732, titled "Method and Apparatus for Adding to the Reserve Area of a Disk Drive," and U.S. patent application Ser. No. 09/648,838, titled "Method and Apparatus for Modifying the Reserve Area of a Disk Drive", filed Aug. 25, 2000, pending, by reference in their entirety.

FIELD OF THE INVENTION

The present invention generally relates to the field of storage devices, and particularly to a system and method for providing a host protected area drive duplication process.

BACKGROUND OF THE INVENTION

A standard disk drive typically includes space for storing data available to the user and a fixed amount of space that is kept in reserve and protected for storing data unavailable to the user. After the manufacturer writes a servo pattern on the disk or disks in a disk drive, the manufacturer fixes the amount of space that is available to the user and the amount of space that is unavailable to the user. Servo writing the disks in the disk drive provides positional information for finding a particular track or group of tracks. The manufacturer then designates that a certain number of tracks will be set aside for a host protected area (HPA) and/or reserve area. Certain critical information to the tracks may be written in the reserve area, such as device firmware and the like. The critical information is typically required to operate the disk drive and is used by the operating system or hardware in the operation of the drive. Typically, the host protected area (HPA) was protected from outside tampering, to preserve the integrity of the data. In most instances, the HPA was even off limits to a computer system manufacturer that integrated the disk drive into a computer system. Thus, a computer system manufacturer could not modify or change the size of the HPA. No such command or set of commands were available to allow anyone beyond the manufacturer of the disk drive to change anything with respect to the HPA as set up by the manufacturer. By restricting such access, the HPA could not be easily copied by a system manufacturer.

For example, information storage media, such as hard disk drives and the like, are often duplicated in high quantities, such as during large scale manufacturing of information appliances and the like electronic devices. A hard disk drive duplicator machine, known as a duplicator, may be used in such large-scale processes. Often information storage media may include a host protected area (HPA), such as a reserve area, to provide various functions and features in additional to the other useable storage area in the remaining portions of the storage medium. Current hard disk duplicators do not recognize the reserve area or HPA so that when copying from a source disk drive that includes an HPA, the HPA is not copied onto the target disk drive or drives. Normally, such reserve areas are not intended to be user accessible, and as a result the reserve area or HPA may not be detected or indicated as present or accessible by most software.

Therefore, it would be desirable to provide a storage device duplication process suitable enabling host protected area duplication.

SUMMARY OF THE INVENTION

Accordingly, the present invention is directed to a host protected area duplication process. The present invention may enable a duplicating machine to copy the entirety of the source drive including the reserve area or HPA to the target hard disk drive or other information storage media.

In a first aspect of the present invention, a method of duplicating electronic data from a source storage device to a target storage device includes detecting a presence of a host protected area (HPA) of a source storage device. Data included in the host protected area (HPA) of the source storage device is copied to a host protected area of a target storage device.

In a second aspect of the present invention, a method of duplicating electronic data from a source storage device to a target storage device includes detecting a presence of a host protected area (HPA) of a source storage device. Size of the host protected area (HPA) of the source storage device is determined. A host protected area (HPA) is created on a target storage device of a size corresponding to the determined size of the host protected area (HPA) of the source storage device. Data included in the host protected area (HPA) of the source storage device is copied to the host protected area of the target storage device.

In a third aspect of the present invention, a method of duplicating electronic data from a source storage device to a target storage device includes detecting a presence of a host protected area (HPA) of a source storage device. Size of the host protected area (HPA) of the source storage device is determined. A host protected area (HPA) is created on a target storage device suitable for storing host protected area (HPA) data from the source storage device. Data included in the host protected area (HPA) of the source storage device is copied to the host protected area of the target storage device.

In a fourth aspect of the present invention, a method of duplicating electronic data from a source storage device to a target storage device includes detecting a presence of a host protected area (HPA) of a source storage device. A presence of a host protected area (HPA) on a target storage device is detected, and if a host protected area (HPA) is present, resetting the host protected area (HPA) of the target storage device. Data included in the host protected area (HPA) of the source storage device is copied to the host protected area of the target storage device.

In a fifth aspect of the present invention, a storage device duplication system includes a source storage device, a target storage device, and a duplicating machine. The source storage device and the target storage device are suitable for storing electronic data. The source storage device includes a host protected area (HPA). The duplicating machine is communicatively coupled to the source storage device and the target storage device. The duplicating machine detects the presence of the host protected area (HPA) of the source storage device and copies data included in the host protected area (HPA) of the source storage device to a host protected area of the target storage device.

In a sixth aspect of the present invention, an electronic data duplication system includes means for storing a source of electronic data, means for storing target storage electronic data and means for duplicating electronic data. The source storage means includes a means for protecting host data. The duplicating means is communicatively coupled to the source storage means and the target storage means. The duplicating means detects the presence of the host data protection means of the source storage means and copies data included in the host data protection means of the source storage means to a host data protection means of the target storage means.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 7 is a diagram illustrating the fields of a read native max command;

FIG. 8 is a diagram illustrating the fields of a response to the read native max command;

FIG. 9 is a diagram illustrating the fields for an error register in the response to the read native max command;

FIG. 10 is a diagram illustrating the fields for a status register in the response to the read native max command;

FIG. 11 is a diagram illustrating the fields of a set max LBA/CYL command;

FIG. 12 is a diagram illustrating the fields of a response to the set max LBA/CYL command;

FIG. 13 is a diagram illustrating the fields for the error register in the response to the set max LBA/CYL command; and FIG. 14 is a diagram illustrating the fields for the status register in the response to the set max LBA/CYL command.

DETAILED DESCRIPTION OF THE INVENTION

Reference will now be made in detail to the presently preferred embodiments of the invention, examples of which are illustrated in the accompanying drawings.

Referring generally now to FIGS. 1 through 14, exemplary embodiments of the present invention are shown. The present invention may provide a duplicating machine, such as a hard disk drive duplicating machine used primarily in the manufacturing of information appliances and the like electronic devices. The duplicating machine is capable of creating a host protected area (HPA) on one or more target hard disk drives as a result of the duplicating process from a source disk drive that includes an HPA. In this way, a complete copying process of a storage device may be performed.

Figure 1:
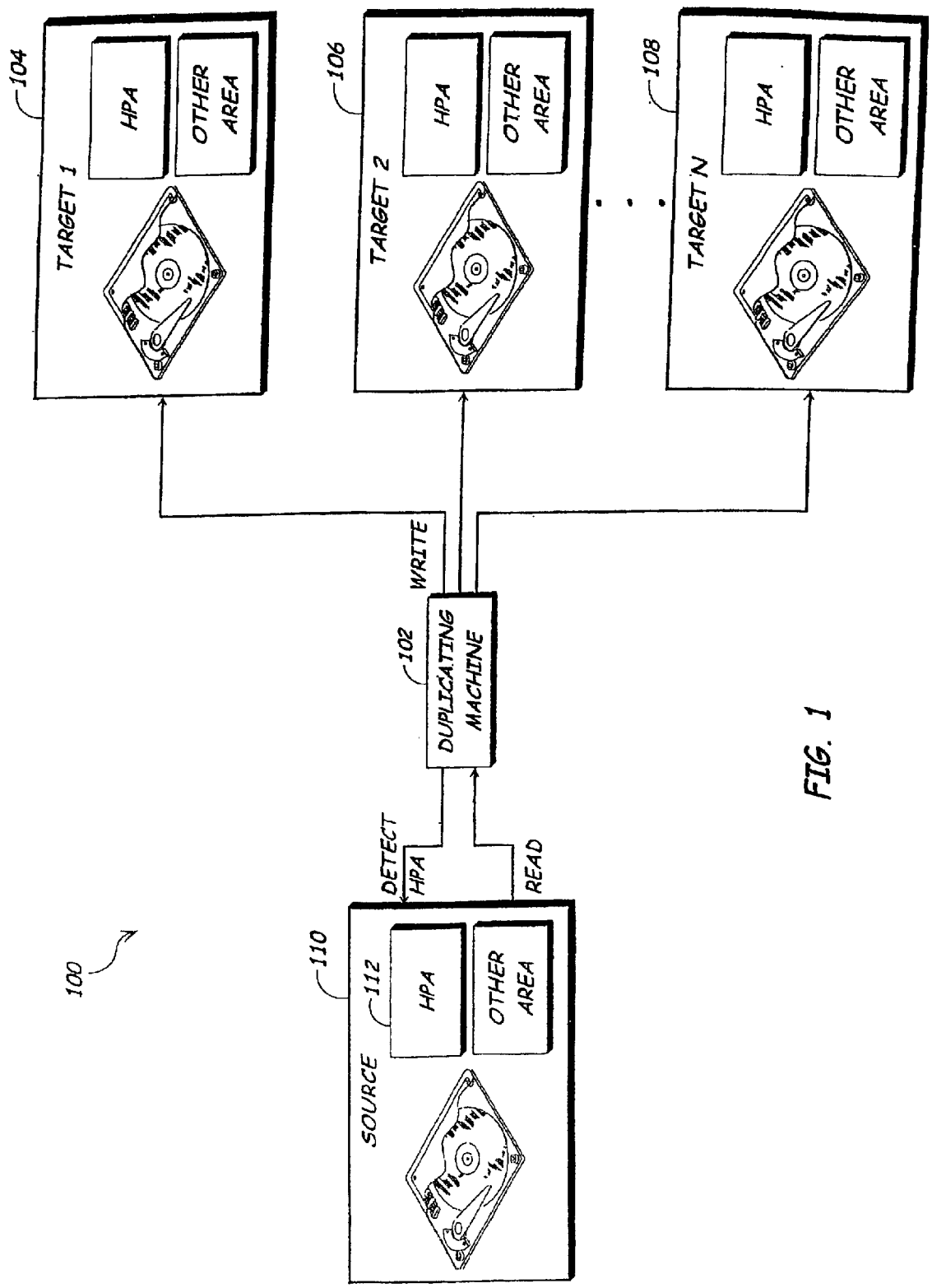
FIG. 1 is a block diagram illustrating an embodiment of the present invention wherein a duplicating machine is suitable for copying data including host protected are data from a source disk to a target disk.

Referring now to FIG. 1, an embodiment of the present invention is shown wherein a duplicating machine is suitable for copying data including host protected are data from a source disk to a target disk. A duplicating system 100 includes a duplicating machine 102 provided with the capability of creating a host protected area (HPA) on one or more target hard disk drives 104, 106 & 108 as a result of the duplicating process from a source disk drive 110 that includes a HPA 112. The duplicating machine 102 has the ability of determining whether a HPA 112 is included on a source disk. If the HPA 112 is present, the duplicating machine 112 may then copy the contents of the HPA 112, as well as other data included on the source disk drive 110 to the target hard disk drive 104, 106 & 108. In this way, the entire contents of a source hard disk drive may be copied to target drives. It should be apparent to a person of ordinary skill in that art that a variety of duplicating machines are contemplated by the present invention without departing from the spirit and scope thereof. For example, a duplicating machine may include a processor and supporting circuitry, may include a controller and/or a computer configuration, for executing a program of instruction so that the duplicator is programmed to provide a structural embodiment and functions in accordance with the present invention. Additionally, a non-dedicated information handling system utilizing software of the present invention may be utilized without departing from the spirit and scope of the present invention.

Figure 2:
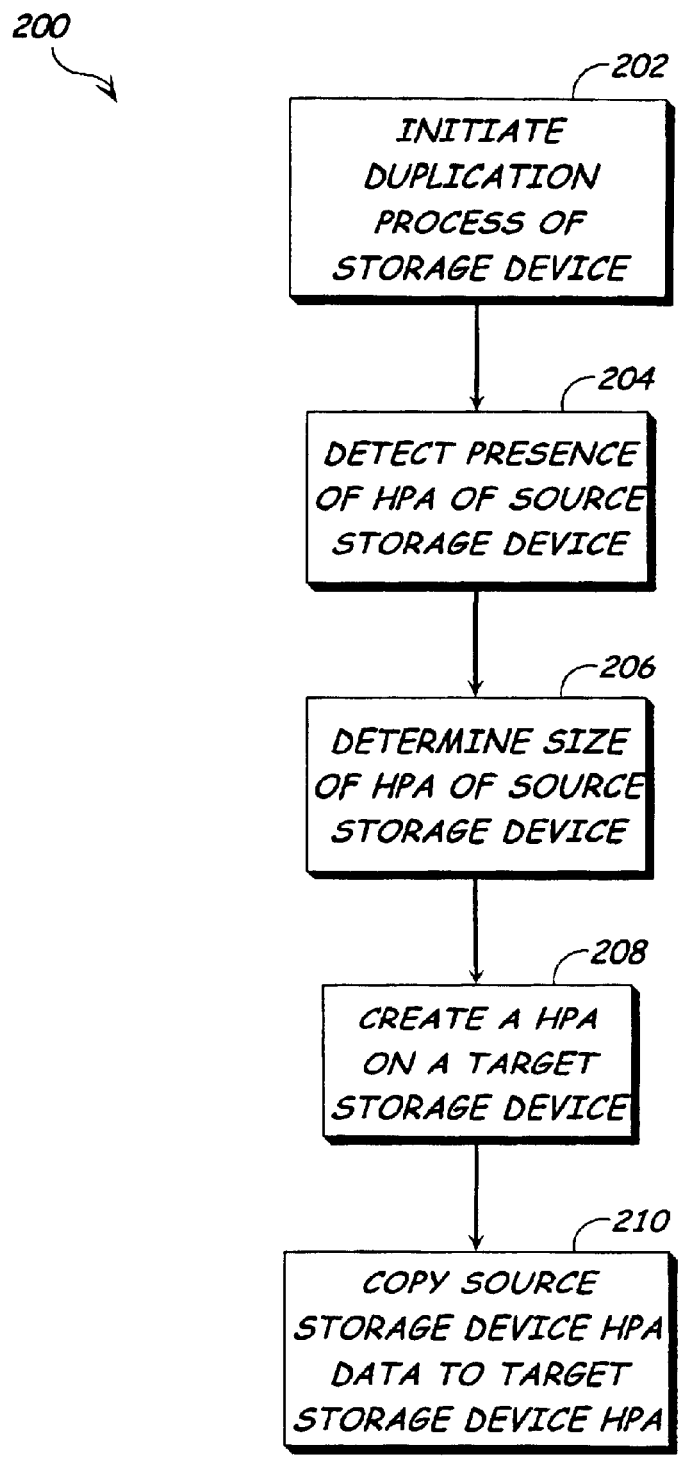
FIG. 2 is a flow diagram depicting an exemplary method of the present invention wherein a storage device including a host protected area is copied to a target storage device.

Referring now to FIG. 2, an exemplary method 200 of the present invention is shown wherein a storage device including a host protected area is copied to a target storage device. A duplication process of a storage device is initiated 202. The presence of a HPA of a source storage device is detected 204, and the size of the HPA is determined 206. It may also be preferable in certain embodiments to determine if a HPA is supported. An HPA is created on a target storage device 208, and the source storage device HPA data is coped to the target storage device HPA 210. It is submitted that the present invention may encompass any suitable information storage medium, such as a hard disk drive, electronic, magnetic, optical, removable medium, or the like type of medium having a reserve area similar or analogous to the reserve area or HPA discussed herein without providing substantial change thereto and without changing the scope of the invention, and may also encompass a variety of interconnect methodologies and other standards, such as ATA, IDE, ATAPI, SCSI, F.C., and the like.

Figure 3:
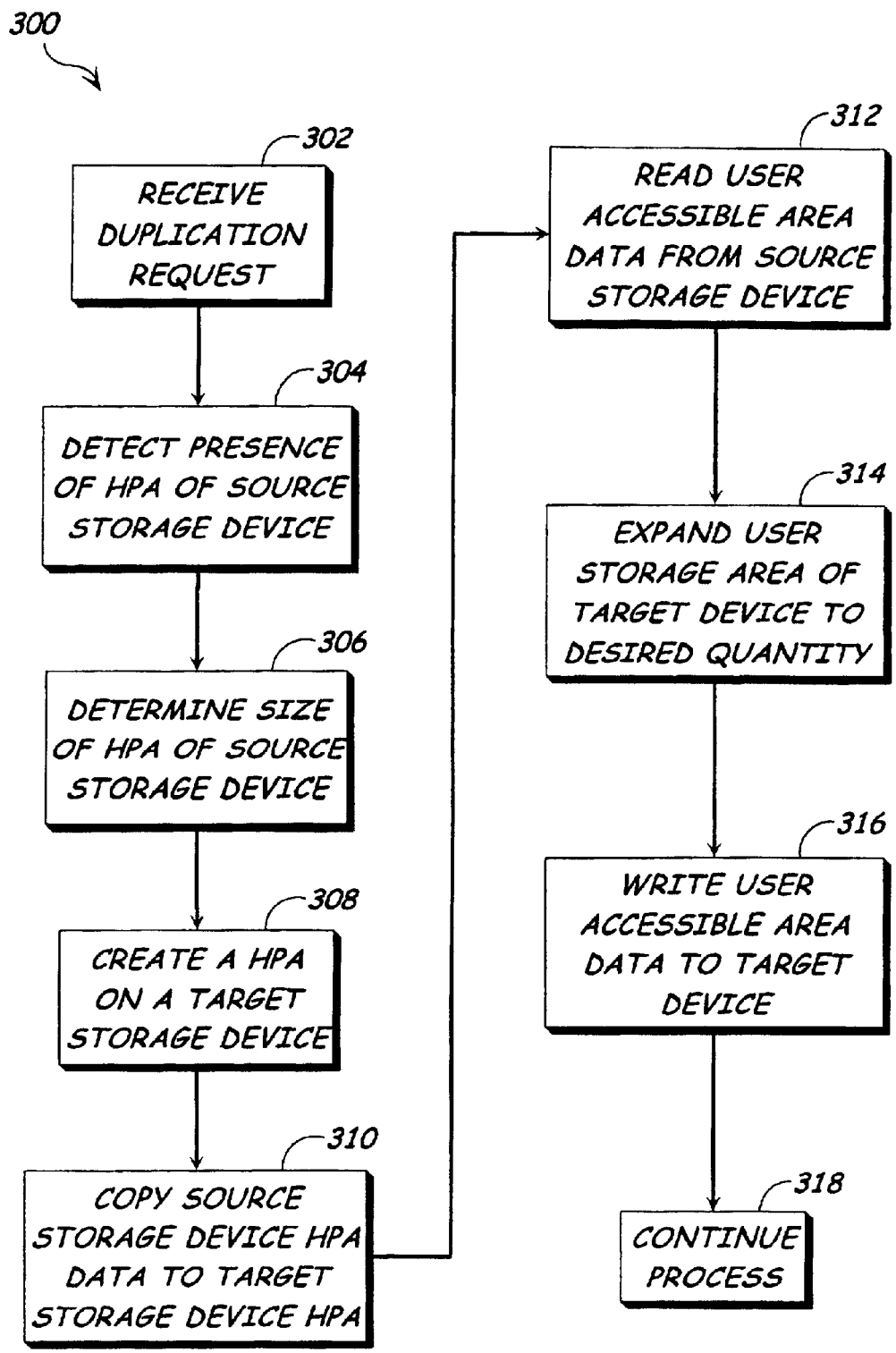
FIG. 3 is a flow diagram illustrating an exemplary method of the present invention wherein a host protected area (HPA) of a source storage device is duplicated to a created host protected area of a target storage device.

Referring now to FIG. 3, an exemplary method 300 of the present invention is shown wherein a host protected area (HPA) of a source storage device is duplicated to a created host protected area of a target storage device. A duplication request is received 302, and the presence of a HPA of a storage device is detected 304. The size of the HPA of the storage device is determined 306. A HPA is created on a target storage device 308. Preferable, the size of the created HPA is sufficient to accommodate a copy of the HPA of the source storage device. The source storage device HPA data may then be copied to the created target storage device HPA 310. User accessible area data from the user accessible portion of the source storage device is read 312. The user storage area of the target device may be expanded to the desired quantity 314, and written to a user accessible area of the target device 316. For example, a 6 gigabyte source storage device may be utilized to provide data to a larger storage device, such as a 10 gigabyte storage device. The target storage device may receive the data from the source storage device, and continue formatting the remaining portion of the storage device for access by a user. In a manufacturing and assembly implementation, the process may continue 318 as desired.

Figure 4:
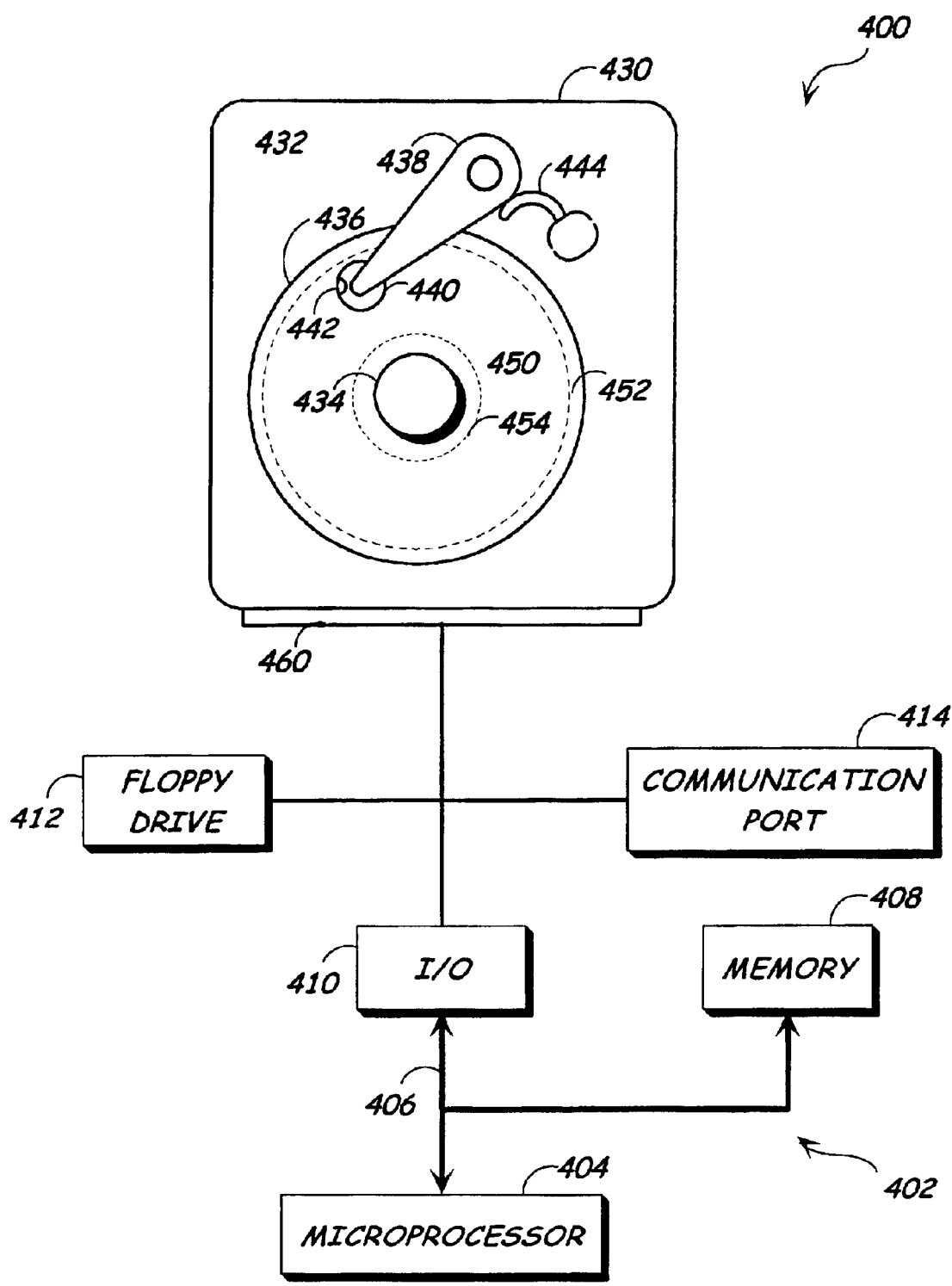
FIG. 4 is an illustration of an embodiment of the present invention wherein an information handling system includes a storage device suitable for acting as a source storage device or target storage device of the present invention.

Referring now to FIG. 4, an exemplary embodiment 400 of the present invention is shown wherein an information handling system 402 includes a storage device configured as a disk drive 430. The information handling system 402 includes a microprocessor 404 having a data and instruction bus 406 for passing commands and data. A memory 408 and an input/output controller 410 are attached to the data and instruction bus 406. A plurality of device may be attached to the input/output controller 410, such is a floppy drive 412, a communications port 414 and a disk drive 430, which may be utilized as a source storage device, target storage device, and the like. The disk drive 430 shown may include a hard or rigid disk drive. The rigid disk drive includes a housing 432 which typically includes a base plate and a cover which form a controlled environment called a disk enclosure. A spindle 434 is attached to the housing. Attached to the spindle 434 is a rigid disk 436. The spindle 434 is capable of rotation and rotates the disk 436 during operation. Also attached to the housing 432 is an actuator arm 438. In FIG. 4, the actuator arm is shown as rotatably attached to the housing 432, however, an actuator arm can also be attached to the housing 432 so that linear motion is achieved. Attached at the end of the actuator arm 438 is a slider 440 which carries a transducer 442. The slider 440 passes over the disk 436 and places the transducer in transducing relationship to the disk 436. The disk 436 includes a multiplicity of tracks which are typically invisible to the naked eye. The actuator arm 438 is moved and controlled to place the transducer 442 over a particular desired track and then maintain the transducer 442 over the desired track until desired information is read from or written to the desired track. In the case of reading information from the track on the disk 436, the transducer is electrically connected to circuitry 444 for amplifying the signal, decoding the signal and transferring the signal to a connector 460. The electrical circuitry 444 typically includes a circuit board, which contains processing circuitry, firmware and other hardware.

An inner track 450 and an outer track 452 are shown as dotted concentric circles on the disk in FIG. 4, however tracks are typically invisible to the naked eye. The inner track 450 and the outer track 452 are just two of a multiplicity of tracks. The tracks located between the inner track 450 and the outer track 452 represent an area of the disk to which a user has access. The outer track is typically numbered track zero (track 0), and the tracks are then numbered consecutively so that the higher numbered tracks are located closer to the center of the disk 436. It should be noted that when a disk drive contains more than one disk, the tracks that share the same number are at about the same distance from the center of the spindle. The tracks having the same number are then said to form a cylinder. The various tracks would be circles on the cylinder.

A HPA 454, which a typical end user may not access, may be located anywhere on the disk 436. The most common location for a reserve area is toward the inner diameter of the disk outside of the inner track of the area to which the user has access. Accordingly, the reserve area 452 is shown inside the inner track 450 on the disk 436. The reason that this is the most common portion of the disk on which to have a reserve area is that these tracks hold the most amount of information per track. Since the inner tracks hold less data or information per track they are also in smaller increments. When adding information to the HPA, such as additional information to a target storage device, a computer manufacturer, user, and the like will determine the size of the information they wish to add. Preferably, the capacity of all the added tracks for the HPA will have to be equal to or greater than the size of information to be added to the reserve area. For example, a computer system manufacturer will add tracks until the amount of storage capacity equals or exceeds the size of the information to add. It should be noted that the tracks capable of holding more information are more valuable in terms of storage available to the user. The tracks capable of holding more information also occur in larger increments. Thus, if an additional track is needed to provide enough capacity to meet the capacity desired to be added to the new reserve area, using the tracks having smaller capacity will waste less capacity otherwise available for the user.

This invention provides a set of commands and a method to allow the detection of the existence and size of the reserve area 454. The set of commands may be enabled/disabled by a password set up between the disk drive manufacturer and the computer system manufacturer for security by exclusion of user access to HPA, such as in ATA5 implementations and the like. The password typically is a command that means nothing to the disk drive other than to allow execution of certain commands as discussed below. By executing the commands, the HPA 454 may be detected and read, such as by a duplicating machine 102 (FIG. 1).

In an exemplary embodiment, the two commands used are READ NATIVE MAX LBA/CYL identify drive command and the SET MAX LBA/CYL. The READ NATIVE MAX LBA/CYL command is akin to a status check of the current parameters that have been set for the source disk drive. The READ NATIVE MAX LBA/CYL command is the request for the status information. The RESPONSE to commands includes the actual status.

The SET MAX LBA/CYL command is the command that requests a new or different user maximum cylinder or logical block address, such as for a target storage device. In other words, this is the command that sets and/or resets the boundary between the user accessible area and the HPA to which the user does not have access.

In contemplated embodiments, the HPA 454 can be reduced by increasing the highest track number to which the user has access. This effectively moves the inner band 450 toward the upper end of the disk 436 to make the HPA 454 smaller and make the portion of the disk accessible to the user (the area between the inner band 450 and the outer band 452) larger. Of course it should be noted that the manufacturer of a disk drive typically sets up the size of an original HPA and stores critical data in the original HPA which is necessary to operate the disk drive. Thus, preferably the modifications will not reduce the size of the HPA to an area that is smaller than the original HPA as set up by the manufacturer of the disk drive. This prevents overwriting of critical information written to the original HPA by the original equipment manufacturer. However, in certain contemplated implementations of the present invention, this may be desirable, such as when overwriting a HPA with new data, as will be discussed later.

Two commands may be enabled with a password set up between the disk drive manufacturer and the computer system manufacturer. Typically the computer system manufacturer must specify the type of password which is to be recognized. It may be preferable to include this password as part of the system BIOS. Thus, when password protected, as the drive firmware reduces the capacity by a predetermined area, drive firmware reports back to a BIOS or OS driver that these special commands needed to gain access to this area fail. An operating system like Windows, Linux, and the like is entirely unaware of the hidden area and cannot access it without special drivers at this point in time. Therefore, in this embodiment, only the system BIOS is aware of this area and knows the hard drive commands, such as IDE commands, to access it. In this way, access to the HPA may be controlled by the BIOS to limit unwanted user actions.

Figure 5A:
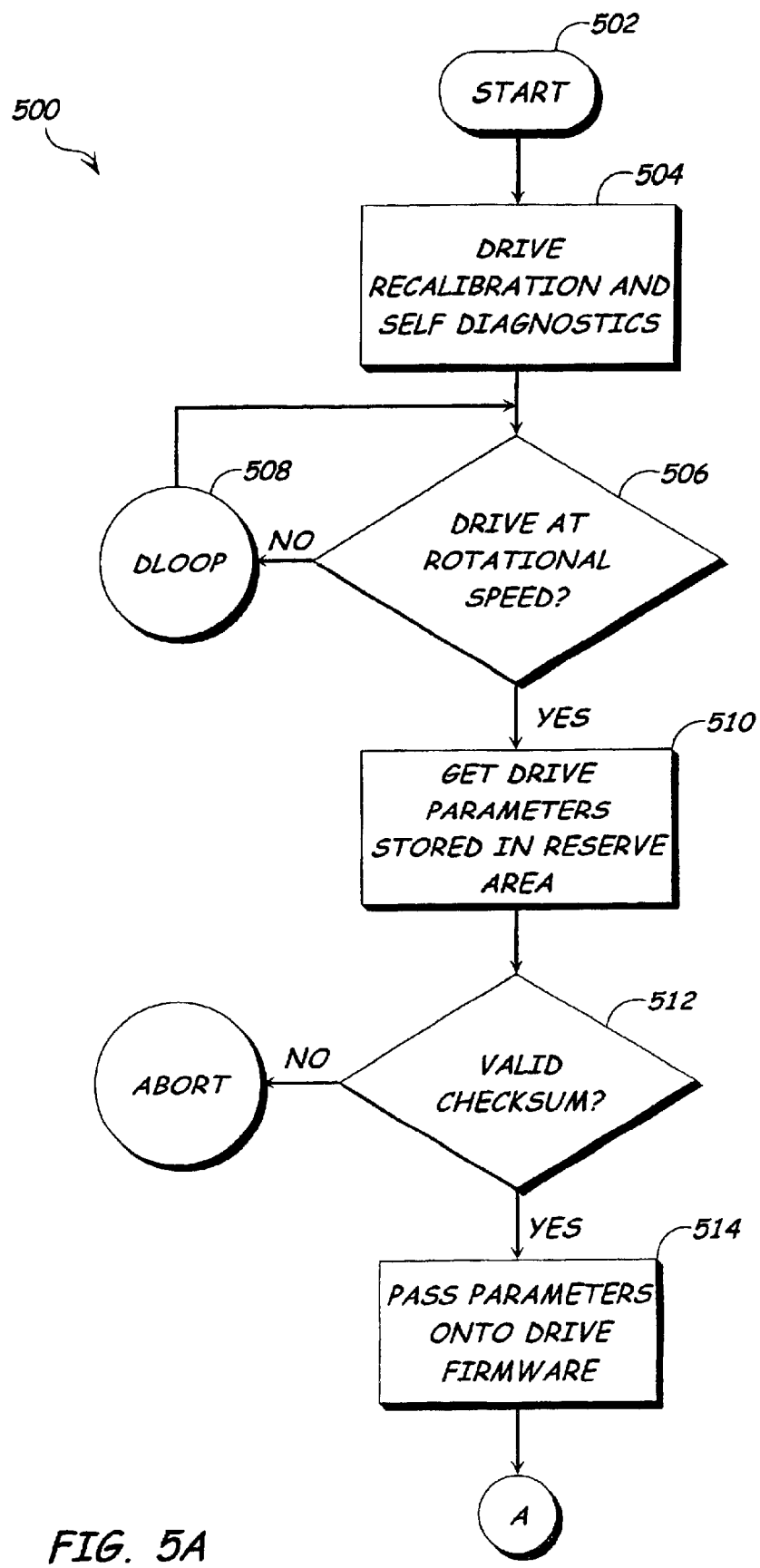
FIGS. 5A & 5B are flow diagrams illustrating an exemplary method of the present invention wherein self-diagnostics, as shown in FIG. 5A, and detection of a host protected area (HPA) of a storage device, as shown in FIG. 5B, are performed.
Figure 5B:
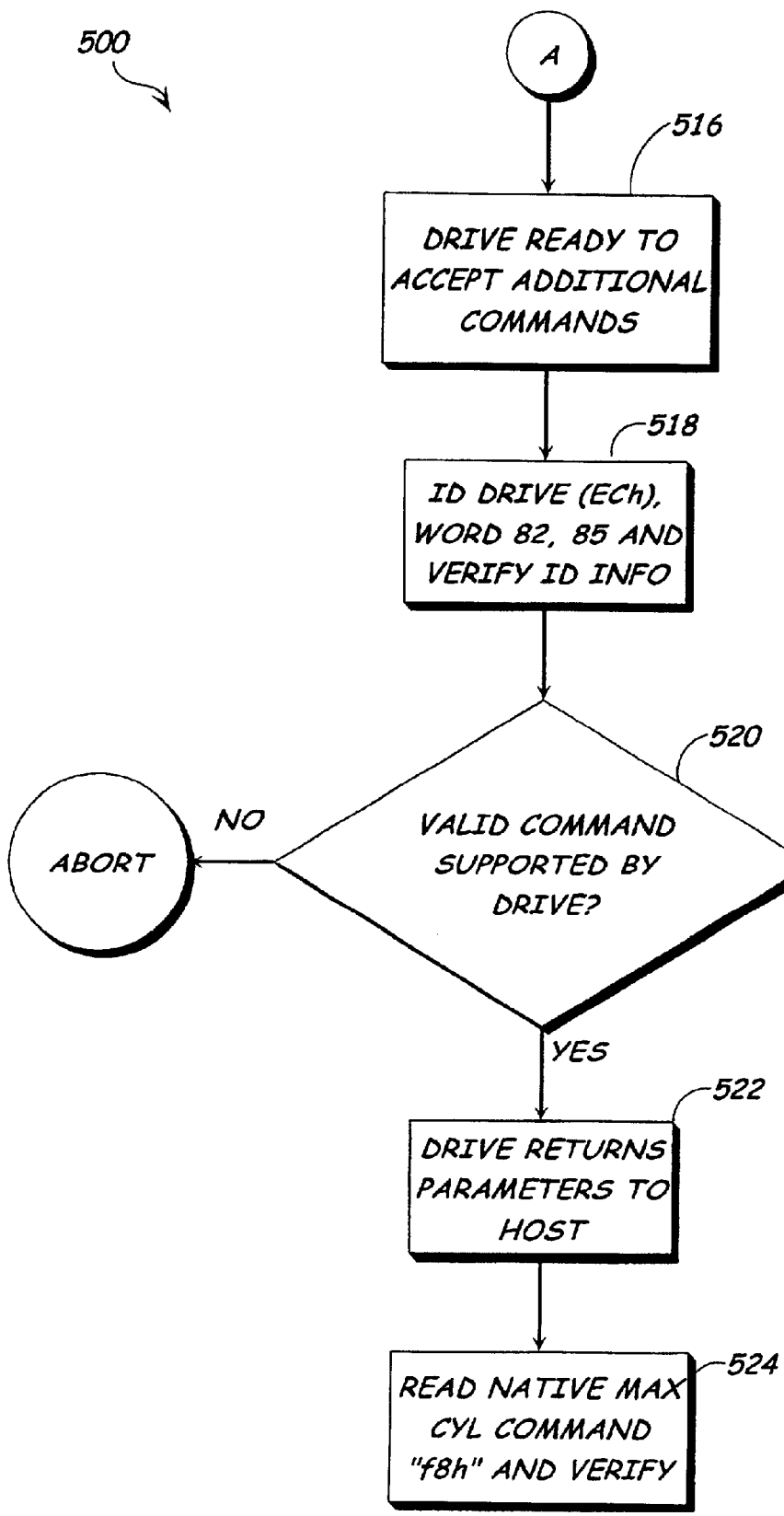

Referring generally now to FIGS. 5A & 5B, exemplary steps utilized to implement this invention will be described in more detail with the aid of the flowchart shown in these figures.

The disk drive 430 (FIG. 4) is started 502. Once started, the drive goes through drive recalibration and a series of self diagnostics 504, to test itself and then as the drive warms up, the drive recalibrates various settings within the drive, such as position error signals and other such features. Once the drive has gone through its self diagnostics and recalibration, the drive checks its rotational speed 506. If the drive is not at its rotational speed, the drive does a loop 508 and rechecks the rotational speed. Once the disk drive has achieved rotational speed, the drive gets the drive parameters that are stored in the negative cylinders or the HPA 510. An additional sum, called a checksum, is calculated and stored with the original disk drive parameters. Upon reading the original parameters, the checksum is then recalculated and compared to the original checksum. If the checksum is valid 512, the drive parameters are passed onto the drive firmware 514. Once the drive parameters are passed onto the drive firmware, the drive is ready to accept additional commands as 516. Firmware may include microprograms that are contained in ROM. Typically, firmware tends to be configured for specific hardware and offers software-type implementation techniques for that hardware. Firmware is generally utilized to move data through the data paths and functional units already present; and is able to effectively process only the instruction formats, data types, and arithmetic modes that are defined for the specific hardware for which it is written.

An additional command that is accepted is an ID DRIVE command, which is identified by the hexadecimal form of an E and a C. The EC command is checked to see if the command is supported by the disk drive's hardware and firmware 520. If it is not supported, the operation aborts. The ID DRIVE command may be utilized to determine if a device supports HPA commands. For instance, in Word 82, 83, 85 and 86 of identification information returned by a device, an indication may be contained which verifies if the command set is supported. If it is supported and it is a valid command, the disk drive returns the drive parameters to the host computer 522. The drive parameters are returned in the RESPONSE to the EC. A READ MAX may be issued to detect HPA size and further verify EC data 524. Read Native Max Cylinder (READ NATIVE MAX LBA/CYL) is identified by the hexadecimal form of an F and an 8 518.

Figure 6A:
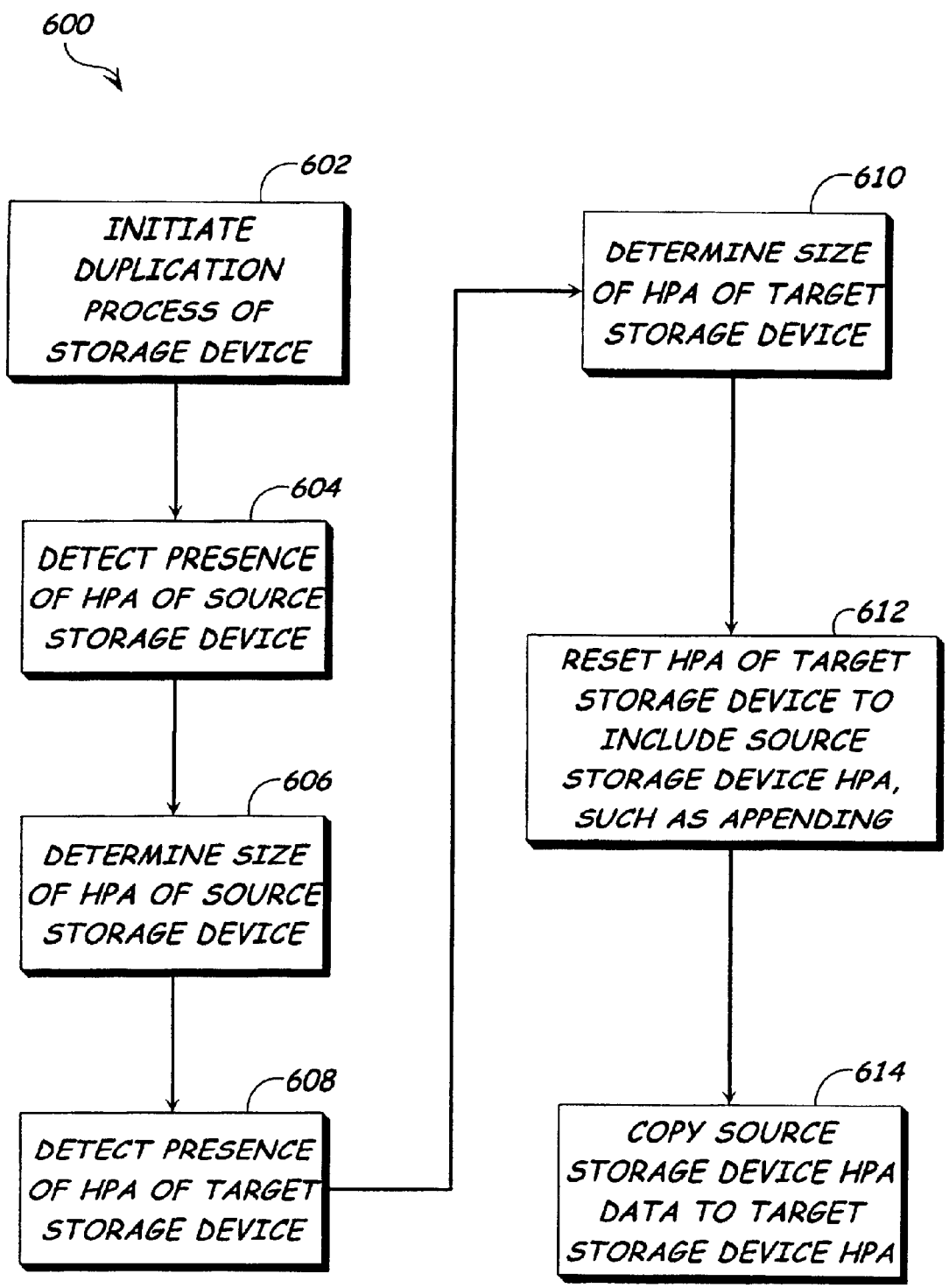
FIG. 6A is a flow diagram of an exemplary method of the present invention wherein a host protected area of a target drive is reset for appending a host protected area of a source drive.

Referring now to FIG. 6A, an exemplary method 600 of the present invention is shown wherein a host protected area of a target drive is reset for appending of a host protected area of a source drive. A duplication process of a source storage device is initiated 602. The presence of a HPA of the source storage device is detected 604. If the source storage device HPA is protected, the HPA is temporarily unlocked. The size of the source storage device HPA is also determined 606. Target storage devices are checked for previously configured HPA 608, and if they exist, are unlocked. The size of the target storage device HPA may also be determined 610, so that if source storage device HPA data may be included with the original target storage device HPA data. For example, the HPA of the target storage device may be reset to include source storage device HPA 612. Therefore, the source storage device HPA data may be copied to the target storage device HPA 614. It should be apparent that the previously stored target storage device HPA may also be overwritten by the source storage device HPA data without departing from the spirit and scope of the present invention. Overwriting may be preferable in instances in which the entirety of the HPA is to be replaced. Further, it should be apparent to a person of ordinary skill in the art that in contemplated embodiments of the present invention, it may be desirable to determine if the device supports a host protected area command set, such as the ID DRIVE command and the like.

Figure 6B:
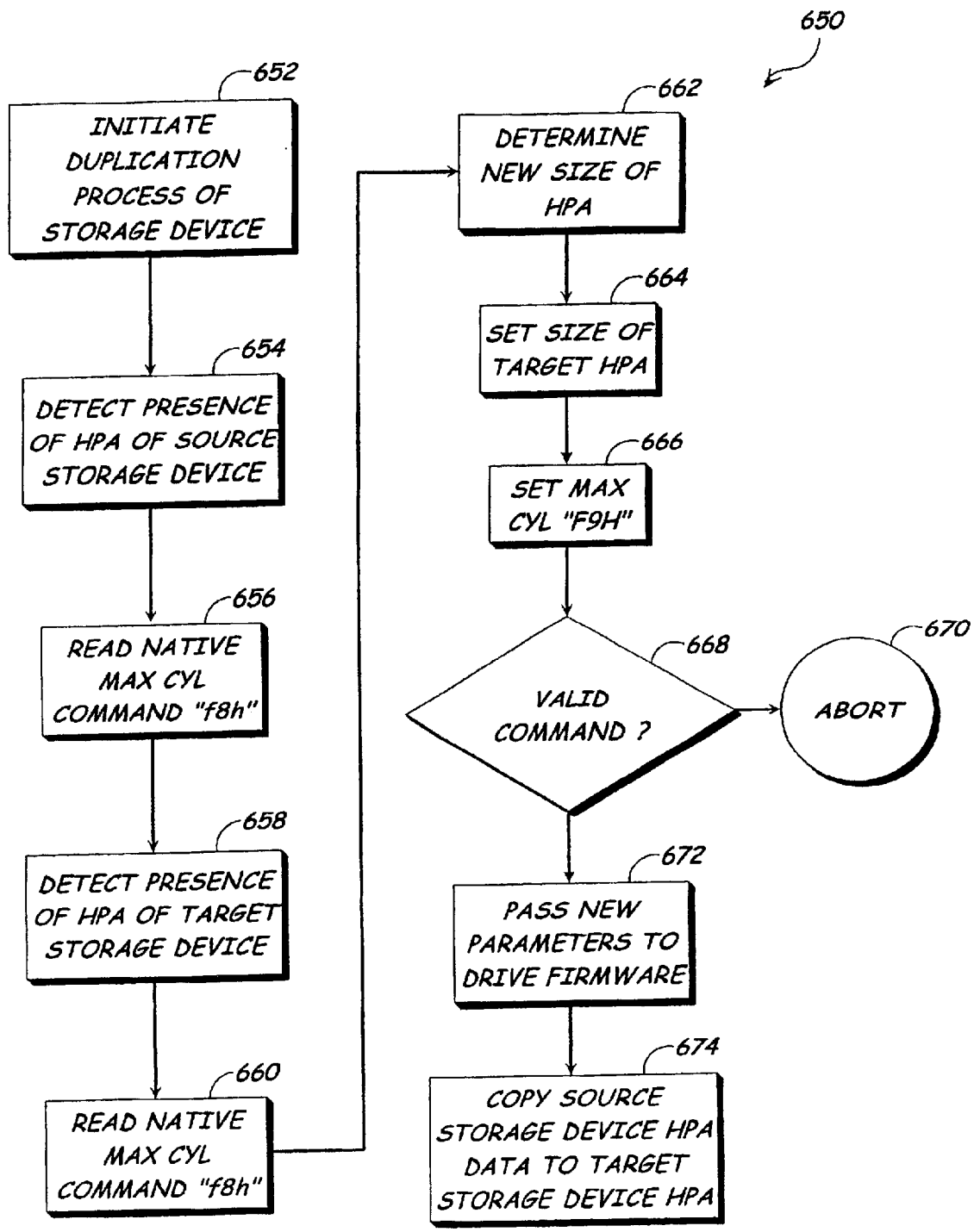
FIG. 6B is a flow diagram depicting an exemplary method of the present invention wherein a target storage device, having a preexisting HPA, has the HPA overwritten/created for accepting data duplicated from a source storage device.

Referring now to FIG. 6B, an exemplary method 650 of the present invention is shown wherein a target storage device, having a preexisting HPA, has the HPA reset for accepting data duplicated from a source storage device. Duplication process of a storage device is initiated 652. The presence of an HPA of a storage device is detected 654, such as EC and a READ NATIVE MAX CYL command "F8h" 656. Additionally, the present of an HPA of a target storage device is detected 658, such as by utilizing EC and a READ NATIVE MAX CYL command 660. The size of the HPA of the target area to include the source storage device HPA data is determined 662. The size of the target storage device HPA may then be set 664, such as by utilizing the SET MAX CYL "F9h" command 666.

For example, the SET MAX CYLANDER command invoked by the hexadecimal F9. This is the command used to set a new maximum cylinder or track number. A reduction in the maximum track number reduces the area to which users have access and increases the HPA to which the users do not have access. This command is checked for validity 668. If the command is invalid, the operation aborts 670. If the command is valid and it is supported by the disk drive's hardware and firmware, the new parameters are passed to the drive firmware 672. The source storage device HPA data may then be copied to the target storage device HPA 674. In this way, a HPA of a target storage device may be reset as desired by a user. In various embodiments of the present invention, a utility is provided which allow configuring of a HPA by entering a total number of sector to be used by a user accessible area, identifies if a storage device supports a SET MAX ADDRESS command, identifies if the drive is currently configured with a HPA, allow unlocking of the HPA if it exists on the drive, and the like.

It should be apparent to a person of ordinary skill in the art that a variety of information may be included in the host protected area without departing from the spirit and scope of the present invention. For instance, the computer system manufacturer may load other information into the HPA which is not user accessible to utilize the HPA as inexpensive nonvolatile storage. Such information may comprise data and programs. Any information or sets of instructions may be loaded into the added reserve area. Some of the uses include adding a portion of the BIOS (Basic Input Output System) to the enlarged reserve area BIOS is usually stored in other nonvolatile hardware such as a BIOS RAM. By off loading some of the BIOS to the reserve area, a smaller capacity, nonvolatile RAM can be used in the computer system. This saves manufacturers and users money since the nonvolatile disk drive space is less expensive than nonvolatile RAM. It should be apparent that a wide variety of information, such as data and program instructions may be stored in the reserve area without departing from the spirit and scope of the present invention, the following embodiments are discussed as exemplary in nature to aid in the description of the present invention.

Another additional use of the added host protected area comprises storing emergency boot up instructions. The boot up instructions are those necessary to start up a computer system. These are typically stored on a floppy or a hard disk. More common is to store these on a hard disk drive. If the disk of the hard disk drive gets damaged in the area where the boot up instructions are located, then the emergency boot up instructions in the reserve area can be used. Previously, users had to look for the floppy disks that held the boot-up instructions before they could get restarted. If it is necessary to use the emergency boot up instructions, the disk drive indicates such necessity to the host. Such necessity also indicates that there may have been some disk damage.

Another use of the added HPA is for storing virus scan or virus detection software. With virus scanning or detecting software in the reserve area and therefore resident on the disk, the disk drive hardware or firmware checks for viruses periodically or after a certain amount of time after having not received a command. In an alternative embodiment, the system scans files before they are saved to the disk. In yet a further embodiment predictive failure information is added by the computer system or to the added HPA 454 (FIG. 4).

A further use of the added HPA is for storing restoration information. Restoration information may be utilized to restore computer system factory settings, such as drivers, files, and the like, in the case of loss of the factory settings due to failure of the system, such as hard drive failure and the like. Typically, restoration information is supplied on a removable medium, such as a floppy disk or compact disk read-only-memory (CD-ROM), to be installed by a user in case of failure. However, these disks may become lost, thereby requiring the user to order an additional medium, download the necessary files on another computer system, and the like. Thus, by providing restoration information in the added HPA 454 on a hard disk drive, a BIOS call may be utilized to restore the computer system in case of failure, corruption, and the like. Further, by providing the restoration information in the reserve area, not only is the cost of a CD-ROM eliminated, but client care support would be improved, as well as factory support and the like. For example, improved client care support could result from the faster access time enabled by storing the information on the hard drive versus the time required to read the information from a CD-ROM. Factory support may be improved by eliminated the need of boot floppies during download. This will speed up the download and increase the number of systems per cell. Further, it could eliminate the testing of drives and free the space, since only bad drives should come back from the field.

The present invention may be implemented utilized a variety of methods. For example, a hot key may be utilized to access the reserved area. Password protection may also be utilized so that only the system BIOS access is allowed. Multiple services may also be supported by the HPA. For instance, system level diagnostics may be stored in the HPA, as well as restoration information, and the like as contemplated by a person of ordinary skill in the art. For example, the firmware may be updated by permitting access to the HPA by a computer system manufacturer, yet still ensure the integrity of the information by blocking access to the reserve area for all other users.

Additionally, a unique code may be assigned to every feature, a unique code to every firmware change at the time the drive is manufactured, or at the time the drive is going through the service center. Preferably, the unique codes are suitable for being updated by a vendor during production or at the service center. Thus, the vendor and the computer system manufacturer may be save both time and money. Preferably, a vendor special signature that is encrypted is included within the data so that only vendor drives have this signature. Thus, the signature may be matched with another signature on the drive itself before loading new software, such as a new firmware.

Further the reserve area may be split into multiple areas. For example, the reserve area may be split into three areas. A first area for disk drive manufactures to store the firmware and features that is prohibited to others, such as the computer manufacturer and the like. A second area may be used by OEM or computer manufacturing to store boot options, OS image, multi-language drives, BIOS's, assistive application software to help customer support to copy and manage files, and the like. A third area may include a generic area for system and diagnostic software. Thus, a general command or password may be utilized to invoke the reserve area and sub-commands may be used to access each of the different sub-areas. Preferably, the sub-commands are vendor unique to insure the integrity of the data contained in each area. Although the use of three subareas are discussed, it should be apparaent that other numbers of subareas may be utilized as contemplated by a person of ordinary skill in the art without departing from the spirit and scope of the present invention.

Referring generally now to FIGS. 7–14, an exemplary embodiment of: the present invention will be described wherein detail of the READ NATIVE MAX LBA/CYL and the SET MAX LBA/CYL commands and the responses to these commands is discussed. It should be noted at the outset, that all these commands and the responses thereto are in a format specifically required for a drive that operates with a standard IDE interface. Specifically, the commands are known as ATA: 4/5 with security commands. In other words, passing the commands and responses across an industry standard interface dictates that the commands are of a specific format which is dictated by the industry standard for ATA commands. One of ordinary skill in art could adapt these commands to use other industry standard interfaces such as SCSI, or SCSI II. The ATA 4/5 command format is for the IDE drives, and is set forth here merely as an illustrative example with respect to other formats.

READ NATIVE MAX LBA/CYL Command:

Now turning specifically to FIG. 7, the details of the READ NATIVE MAX LBA/CYL command will be discussed. There are commands that govern AT attachment which are known as the ATA commands. Communication to or from any device, such as this disk drive, is through an I/O Register that routes the input or output data to or from registers associated with the ATA command block. The Command Block Registers are used for sending commands to the device or posting status from the device. The Control Block Registers are used for device control and to post alternate status. The command block registers include ten, 8-bit registers. The ten registers are for DATA, FEATURE, SECTOR COUNT, SECTOR NUMBER. CYLINDER

LOW, CYLINDER HIGH, DEVICE/HEAD, COMMAND, STATUS, AND ERROR.

ATA commands being written to devices and status being read from the devices is done through ten 8-bit registers that form the ATA Command Block. Each register is addressed by using the signals from the host (CSO-, CS1-, DA2, DA1, DAO, DIOR- and DIOW-). When writing a command to a device, the contents that have been written to the Data, Features, Sector Count, Sector Number, Cylinder Low, Cylinder High and Device/Head registers are treated as parameters of the command that is written to the Command register. Command processing begins when the Command register is written to. All the registers, except the command register, act as parameters for the command. Basically, the parameters are set first and then the command is issued.

The details of the READ NATIVE MAX ADDRESS command will be discussed. For this command, the Data, Features, Sector Count, Sector Number, Cylinder Low and Cylinder High registers are not used and therefore, do not need to be initialized. The command (F8h) is written to the Command register after first writing a value into the Device/Head register. The value written to the Device/Head register indicates which device should respond to the command and whether the MAXADDRESS returned should be reported as an LBA (Logical Block Address) value or as a CHS (Cylinder-Head-Sector) value.

The DEVICE/HEAD register defines which drive (slave or master) and the mode in which the drive operates (LBA mode is Logical Block Address Mode). All eight bits of the 8-bit COMMAND register specify the command. The first four bits of the COMMAND for the READ NATIVE MAX LBA/CYL command are 1111. The second four bits COMMAND for the READ NATIVE MAX LBA/CYL command are 1000. Four bits can be arranged in sixteen different ways which gives rise to the term hexadecimal. The hexadecimal which historically is equal to a "fox" or F is the combination with a 1111. The hexadecimal which historically is equal to a 8 is the combination with a 1000. Two hexadecimals define an eight bit register. The first four of the COMMAND for the READ NATIVE MAX LBA/CYL command equal the hexadecimal F and the last four equal the hexadecimal 8. Thus, the command is termed an F8 command.

READ NATIVE MAX LBA/CYL command:

If the READ NATIVE MAX LBA/CYL command is considered valid, the drive returns the parameters to the host 522 (FIG. 5B). The returned parameters are set forth in the RESPONSE TO THE READ NATIVE MAX LBA/CYL. The RESPONSE TO THE READ NATIVE MAX LBA/CYL command is in the format of an ATA command block which is a matrix of seven, 8-bit registers. Each 8-bit register is not used in the RESPONSE TO THE READ NATIVE MAX LBA/CYL command. As shown in FIG. 8, the command block for the RESPONSE TO THE READ NATIVE MAX LBA/CYL includes seven, 8-bit registers for ERROR, SECTOR COUNT, SECTOR NUMBER, CYLINDER LOW, CYLINDER HIGH, DEVICE/HEAD, and STATUS.

The 8-bit registers for DATA, ERROR, SECTOR COUNT are not used in the RESPONSE TO THE READ NATIVE MAX LBA/CYL command returned to the host. The host reads the parameters from the 8-bit registers for the SECTOR NUMBER, CYLINDER LOW, CYLINDER HIGH, and the last four bits of the DEVICE/HEAD register. The values are typically ones and zeros that convey a particular Sector Number, a particular cylinder for Cylinder Low and a particular cylinder for Cylinder High and MAX HEAD Number.

Once the max LBA/CYLINDER parameters are obtained, the device or disk drive places the parameters into the 8-bit registers for SECTOR NUMBER, CYLINDER HIGH, CYLINDER LOW, and DEVICE/HEAD. Once these parameters are in these registers, the status bit indicating that the command is complete DRQ is ready and then set. Int is generated if pien=1. The host then reads the parameters from the registers.

The ERROR REGISTER/Field

The ERROR register is used in the RESPONSE TO THE READ NATIVE MAX LBA/CYL command when an error is detected while executing the command. The error register is shown blank in FIG. 8. In actuality, the error register shown in FIG. 7 may be filled. The error register is an 8 bit register. Each bit of the 8 bit register indicates a specific error as shown in FIG. 9. Each of the bits in the registers of the error register indicates a particular type of error.

The STATUS REGISTER/Field

The STATUS register is another 8 bit register as shown in FIG. 10. The bits in status register change while the RESPONSE TO THE READ NATIVE MAX LBA/CYL command are filled and changed while different parameters in the other registers are being filled. As mentioned above, the host polls the status with respect to fulfilling the command and the bits in the 8 bit STATUS register convey this information. The 8 bit status register is shown blank in FIG. 8, but is detailed in FIG. 10. Each of the bits in the STATUS REGISTER indicates the type of status as is shown in FIG. 10.

Listed below are various parameters associated with the READ NATIVE MAX LBA/CYL command and the RESPONSE TO THE READ NATIVE MAX LBA/CYL command. The parameters associated with the READ NATIVE MAX LBA/CYL command are listed as Output Parameters to the Drive.

The parameters associated with the RESPONSE TO THE READ NATIVE MAX LBA/CYL command are the remaining parameters listed. Specifically, the parameters associated with the RESPONSE TO THE READ NATIVE MAX LBA/CYL, command are the Input Parameters from the Drive, parameters associated with the Error Registers, and parameters associated with the Status registers.

Output Parameters to the Drive

| | |
|---|---|
| L | LBA mode. Indicates the addressing mode. L=0 specifies CHS mode and L=1 does LBA addressing mode. |
| D | Drive. When D=0, Drive 0 (Master) is selected. When D=1, drive 1 (Slave) is selected. |
| V | Valid. Indicates that the bit is part of an output parameter and should be specified. |
| — | Indicates that the bit is not used. |

Input Parameters From The Drive

| | |
|---|---|
| Sector Number | In LBA mode, This register contains Native Max LBA bits 0–7. (L=1) In CHS mode, this register contains Native Max sector number. (L=0) |
| Cylinder High/Low | In LBA mode, this register contains native Max LBA bits 8–15 (low), 16–23 (high), (L=1) In CHS mode, this register contains native max cylinder number. (L=0) |
| DEVICE/ HEAD | In LBA mode, this register contains native Max LBA bits 24–27. (L=1) In CHS mode, this register contains native max head number. (L=0) |
| V | Valid, indicates that the bit is part of an output parameter and should be specified. |
| — | Indicates that the bit is not used. |

Error Registers

| | |
|---|---|
| ABT | Aborted command, ABT=1 indicates the requested command has been aborted due to a drive status error or an invalid parameter in an output register. |

-continued

Status Registers

| | |
|---|---|
| RDY | Drive ready, RDY=1 indicates that the drive is capable of responding to a command, RDY will be set to 0 during power on until the drive is ready to accept a command. If the drive detects an error while processing a command, RDY is set to 0 until the status register is read by the Host, at which time RDY is set back to 1. |
| ERR | Error, ERR=1 indicates that an error occurred during execution of the previous command. The Error Register should be read to determine the error type. The drive sets ERR=0 when the next command is received from the Host. |

Once the RESPONSE TO THE READ NATIVE MAX LBA/CYL command is received by the host, the SET MAX CYL command may be issued by the host to the disk drive.

SET MAX CYL Command

Once the RESPONSE TO THE READ NATIVE MAX LBA/CYL command is received by the host, the SET MAX LBA/CYL command may be issued by the host to the disk drive, such as to resize a host protected area (HPA) of a target storage device. This command set overwrites the maximum logical block address or maximum cylinder (LBA/CYL) of the disk drive to reset the drive capacity available to the user and increase or decrease the HPA or the capacity unavailable to the user. Once the command is received and the drive parameters are modified, then all accesses beyond the maximum logical block address or cylinder (LBA/CYL) of the disk drive are rejected by setting an abort bit which is one of the 8 bits in the Error Register (shown in FIG. 13).

SET MAX CYL COMMAND

Now turning specifically to the exemplary embodiment shown in FIG. 11 the details of the SET MAX CYL command will be discussed. As mentioned before with respect to the Read Native Max command, there are commands that govern AT attachment which are known as the ATA commands. Communication to or from any device, such as this disk drive, is through an I/O Register that routes the input or output data to or from registers associated with the ATA command block. The Command Block Registers are used for sending commands to the device or posting status from the device. The Control Block Registers are used for device control and to post alternate status. The command block registers include nine, 8-bit registers. The nine registers are for FEATURE ERROR, SECTOR COUNT, SECTOR NUMBER, CYLINDER LOW, CYLINDER HIGH, DEVICE/HEAD, COMMAND STATUS, ALT STATUS, and DEVICE CONTROL.

ATA commands being written to devices and status being read from the devices is done through eight 8-bit registers that form the ATA Command Block. Each register is addressed by using the signals from the host (CSO-, CS1-, DA2, DA1, DAO, DIOR- and DIOW-). When writing a command to a device, the contents that have been written to the Features, Sector Count, Sector Number, Cylinder Low, Cylinder High and Device/Head registers are treated as parameters of the command that is written to the Command register. Command processing begins when the Command register is written to. All the registers, except the command register, act as parameters for the command. Basically, the parameters are set first and then the command is issued.

The details of the SET MAX CYL command will now be discussed. For this command the DATA and FEATURE registers are not used and therefore, do not need to be initialized. The SECTOR COUNT, SECTOR NUMBER, CYLINDER LOW, and CYLINDER HIGH are each 8-bit registers used to set the parameters of the SET MAX CYL command. The bits in these 8-bit registers are set before the SET MAX CYL command is run. The bits of the SECTOR COUNT, SECTOR NUMBER, CYLINDER LOW, and CYLINDER HIGH are used in the SET MAX CYL command to specify the value of the new highest cylinder to which the user has access. The DEVICE/HEAD register is used to define the type of drive (slave or master) and the mode in which the drive operates (LBA mode is Logical Block Address Mode). One bit of the SECTOR COUNT register is used to indicate whether the selection will be nonvolatile or volatile. In other words, if this is a temporary selection or a permanent selection.

All eight bits of the 8-bit COMMAND register are used to specify the command. The first four bits of the COMMAND for the SET MAX CYL command are 1111. The second four bits of the COMMAND for the SET MAX CYL command are 1001. Four bits or fields can be arranged in sixteen different ways which gives rise to the term hexadecimal. The hexadecimal which historically is equal to a "fox" or F is the combination with a 1111. The hexadecimal which historically is equal to a 9 is the combination with a 1001. Two hexadecimals define an eight bit register. The first four bits in the 8-bit COMMAND register for the SET MAX CYL command equal the hexadecimal F and the second four bits the 8-bit COMMAND register for the SET MAX CYL command equal the hexadecimal 9. Thus, the SET MAX CYL command is termed an F9 command.

RESPONSE TO THE SET MAX CYL Command

If the SET MAX CYL command is considered valid, the new parameters are passed to the firmware of the disk drive device. The disk drive device returns the parameters to the host 522 (FIG. 5B). The returned parameters are set forth in the RESPONSE TO THE SET MAX CYL command. The RESPONSE TO THE SET MAX CYL command is in the format of any ATA command block which is a matrix of eight, 8-bit registers. As shown in FIG. 12, the command block input registers for the RESPONSE TO THE SET MAX CYL command include eight, 8-bit registers called ATL STATUS, ERROR, SECTOR COUNT, SECTOR NUMBER, CYLINDER LOW, CYLINDER HIGH, DEVICE/HEAD, and STATUS.

Bits in the DATA, ERROR, SECTOR COUNT registers are not used to set parameters for the RESPONSE TO THE SET MAX CYL command and therefore are not initialized. The drive parameters are conveyed by bits in the SECTOR NUMBER, CYLINDER LOW, CYLINDER HIGH, and DEVICE/HEAD 8-bit registers. The bits in these 8-bit registers convey the parameters for a particular Sector Number, a particular cylinder for Cylinder Low and a particular cylinder for Cylinder High. The bits of the DEVICE/HEAD register are used to convey parameters about the type of drive (slave or master) and the mode in which the drive operates LBA mode is Logical Address Block mode).

The ERROR REGISTER/Field

Bits in the 8-bit ERROR Register may also be used in the event an error is detected. The last four bits of the ERROR Register are used when an error is detected while executing the SET MAX LBA/CYL command. The ERROR Register is not shown in FIG. 12, but are detailed in FIG. 13. Each of the bits in the ERROR Register indicates the type of error as is shown in FIG. 13.

The STATUS REGISTER/Field

Bits in the 8-bit STATUS register change while the RESPONSE TO THE SET MAX LBA/CYL command is being filled and as different parameters in other registers are being filled. The host polls the STATUS register as the command is being filled. The bits in the 8-bit STATUS register convey information about which of the parameters has returned and if all the parameters necessary to fulfill the RESPONSE TO THE SET MAX LBA/CYL command have been returned. The 8-=bit STATUS register is shown blank in FIG. 12, but is detailed in FIG. 14. Each of the bits in the STATUS register indicates the type of status as is shown in FIG. 14.

Polling, if nien=1, wait for interrupt. Once the SET MAX LBA/CYL command is received and the drive parameters are modified, then all access attempts beyond the Logical Block Address or Cylinder designated by this command are rejected. Upon rejecting the access a bit in the ERROR register indicates an abort.

Listed below are various parameters associated with the SET MAX LBA/CYL command and the RESPONSE TO THE SET MAX LBA/CYL command. The parameters associated with the SET MAX LBA/CYL command are listed as Output Parameters to the Drive.

The parameters associated with the RESPONSE TO THE SET MAX LBA/CYL command are the remaining parameters listed. Specifically, the parameters associated with the RESPONSE TO THE SET MAX LBA/CYL command are the Input Parameters from the Drive, parameters associated with the Error Registers, and parameters associated with the Status registers.

| Output Parameters to the Drive | |
|---|---|
| B | Option bit for selection whether nonvolatile or volatile. B=1 is volatile condition, when B=1, Max LBA/CYL which is set by SET MAX LBA/CYL command is preserved by POR, HARD RESET and SOFT RESET. When B=0, MAX LBA/CYL which is set by SET MAX LBA/CYL command will be lost by POR, HARD RESET and SOFT RESET. |
| Sector Number | In LBA mode, this register contains LBA bits 0–7 which is to be set. (L=1) In CHS mode, this register is ignored. (L=0) |
| Cylinder High/LOW | In LBA mode, this register contains LBA bits 8–15 (low), 16–23 (high) which is to be set, (L=1) In CHS mode, this register contains cylinder number which is to be set, (L=0) |
| DEVICE/HEAD | In LBA mode, this register contains LBA bits 24–27 which is to set (L=1) In CHS mode, this register is ignored. (L=0) |
| L | LBA mode, indicates the addressing mode, L=0 specifies CHS mode and L=1 does LBA addressing mode. |
| D | Drive. When D=0, the drive 0 (master) is selected, when D=1 drive 1 (slave) is selected. |
| V | Valid. Indicates that the bit is part of an output parameter and should be specified. |
| — | Indicates that the bit is not used. |
| Input Parameters From The Drive | |
| Sector Number | In LBA mode, this register contains max LBA bits 0–7 which is set. (L=1) In CHS mode, this register contains max sector number. (L=0) |
| Cylinder High/Low | In LBA mode, this register contains max LBA bits 8–15 (Low), 16–23 (HIGH) which is set. (L=1) In CHS mode, this register contains max cylinder number which is set. (L=0) |
| DEVICE/HEAD | In LBA mode, this register contains max LBA bits 24–27 which is set. (L=1) In CHS mode, this register contains max head number. (1=0) |
| V | Valid. Indicates that the bit is part of an output parameter and should be specified. |
| — | Indicates that the bit is not used. |
| Error Registers | |
| ABT | Aborted command. ABT=1 indicates the requested command has been aborted due to a drive status error or an invalid parameter in an output register. |

-continued

| Status Registers | |
|---|---|
| RDY | Drive ready. RDY=1 indicates that the drive is capable of responding to a command. RDY will be set to 0 during power on until the drive is ready to accept a command. If the drive detects an error while processing a command, RDY is set to 0 until the Status Register is read by the Host, at which the RDY is set back to 1. |
| ERR | Error. ERR=1 indicates that an error occurred during execution of the previous command. The Error Register should be read to determine the error type. The drive sets ERR=0 when the next command is received from the host. |

SET MAX is typically issued an non-volatile by a dupper. The identify drive command supports/defines the following:

Identify Drive Command, which may be utilized by a dupper.

Word 82 Bit 10  1=Host protected area set supported
Word 83 bit 8   1 = Set MAX security extension supported
                Once the HPA is set the following bits are set to 1.
Word 85 bit 10  1 = host protected area feature set enable
Word 86 bit 8   1 = set max security extension enabled by SET MAX SET PASSWORD In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the host protected area duplication system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of duplicating electronic data from a source storage device to a target storage device, comprising:
   detecting a presence of a host protected area of a source storage device; and
   copying data included in the host protected area of the source storage device to a host protected area of a target storage device.

2. The method as described in claim 1, further comprising determining size of the host protected area of the source storage device.

3. The method as described in claim 2, further comprising creating a host protected area on the target storage device of a size corresponding to the determined size of the host protected area of the source storage device.

4. The method as described in claim 3, wherein the size of the host protected area of the target storage device is suitable for at least one of including the host protected area of the source storage device, including the host protected area of the source storage device and at least a portion of a previously stored host protected area data of the target storage device.

5. The method as described in claim 1, further comprising creating a host protected area on the target storage device suitable for storing host protected area data from the source storage device.

6. The method as described in claim 1, wherein a previously stored host protected area of the target storage device is overwritten by the host protected area of the source storage device.

7. The method as described in claim 1, further comprising copying user accessible data from the source storage device to the target storage device, the user accessible data stored on a user accessible area of the target storage device.

8. The method as described in claim 1, further comprising detecting a presence of a host protected area on the target storage device, and if a host protected area is present, resetting the host protected area of the target storage device.

9. The method as described in claim 8, wherein the host protected area is detected utilizing a EC and READ NATIVE MAX CYL command and the host protected area is reset utilizing a SET MAX CYL command.

10. The method as described in claim 1, wherein the presence of a host protected area is detected utilizing a READ NATIVE MAX CYL command.

11. A method of duplicating electronic data from a source storage device to a target storage device, comprising:
   detecting presence of a host protected area of a source storage device;
   determining size of the host protected area of the source storage device;
   creating a host protected area on a target storage device of a size corresponding to the determined size of the host protected area of the source storage device; and
   copying data included in the host protected area of the source storage device to the created host protected area of the target storage device.

12. The method as described in claim 11, wherein the size of the host protected area of the target storage device is suitable for at least one of including the host protected area of the source storage device, including the host protected area of the source storage device and at least a portion of a previously stored host protected area data of the target storage device.

13. The method as described in claim 11, wherein the creates host protected area on the target storage device is suitable for storing host protected area data from the source storage device.

14. The method as described in claim 11, wherein creating a host protected area on the target storage device includes overwriting a previously stored host protected area of the target storage device by the host protected area of the source storage device.

15. The method as described in claim 11, further comprising copying user accessible data from the source storage device to the target storage device, the user accessible data stored on a user accessible area of the target storage device.

16. The method as described in claim 11, further comprising detecting a presence of a host protected area on the target storage device, and if a host protected area is present, resetting the host protected area of the target storage device to create the host protected area of the target storage device suitable for storing host protected area data from the source storage device.

17. The method as described in claim 16, wherein the host protected area is detected utilizing a READ NATIVE MAX CYL command and the host protected area is reset utilizing a SET MAX CYL command.

18. The method as described in claim 11, wherein the presence of a host protected area is detected utilizing a READ NATIVE MAX CYL command.

19. A method of duplicating electronic data from a source storage device to a target storage device, comprising:
   detecting presence of a host protected area of a source storage device;
   creating a host protected area on a target storage device suitable for storing host protected area data from the source storage device; and
   copying data included in the host protected area of the source storage device to the created host protected area of the target storage device.

20. The method as described in claim 19, further comprising determining size of the host protected area of the source storage device.

21. The method as described in claim 20, wherein a host protected area on the target storage device is created of a size corresponding to the determined size of the host protected area of the source storage device.

22. The method as described in claim 21, wherein the size of the host protected area of the target storage device is suitable for at least one of including the host protected area of the source storage device, including the host protected area of the source storage device and at least a portion of a previously stored host protected area data of the target storage device.

23. The method as described in claim 19, wherein a previously stored host protected area of the target storage device is overwritten by the host protected area of the source storage device.

24. The method as described in claim 19, further comprising copying user accessible data from the source storage device to the target storage device, the user accessible data stored on a user accessible area of the target storage device.

25. The method as described in claim 19, further comprising detecting a presence of a host protected area on the target storage device, and if a host protected area is present, resetting the host protected area of the target storage device to create the host protected area of the target storage device suitable for storing host protected area data from the source storage device.

26. The method as described in claim 25, wherein the host protected area is detected utilizing a READ NATIVE MAX CYL command and the host protected area is reset utilizing a SET MAX CYL command.

27. The method as described in claim 19, wherein the presence of a host protected area is detected utilizing a READ NATIVE MAX CYL command.

28. A method of duplicating electronic data from a source storage device to a target storage device, comprising:
   detecting presence of a host protected area of a source storage device;
   detecting a presence of a host protected area on a target storage device, and if a host protected area is present, resetting the host protected area of the target storage device; and
   copying data included in the host protected area of the source storage device to the host protected area of the target storage device.

29. The method as described in claim 28, further comprising determining size of the host protected area of the source storage device.

30. The method as described in claim 29, wherein the host protected area on the target storage device is reset to a size corresponding to the determined size of the host protected area of the source storage device.

31. The method as described in claim 30, wherein the size of the host protected area of the target storage device is suitable for at least one of including the host protected area of the source storage device, including the host protected area of the source storage device and at least a portion of a previously stored host protected area data of the target storage device.

32. The method as described in claim 29, further comprising creating a host protected area on the target storage device suitable for storing host protected area data from the source storage device.

33. The method as described in claim 29, wherein a previously stored host protected area of the target storage device is overwritten by the host protected area of the source storage device.

34. The method as described in claim 29, further comprising copying user accessible data from the source storage device to the target storage device, the user accessible data stored on a user accessible area of the target storage device.

35. The method as described in claim 29, wherein the host protected area is detected utilizing a READ NATIVE MAX CYL command and the host protected area is reset utilizing a SET MAX CYL command.

36. The method as described in claim 29, wherein the presence of a host protected area is detected utilizing a READ NATIVE MAX CYL command.

37. A storage device duplication system, comprising:
a source storage device suitable for storage of electronic data, the source storage device including a host protected area;
a target storage device suitable for storing electronic data; and
a duplicating machine communicatively coupled to the source storage device and the target storage device, wherein the duplicating machine detects the presence of the host protected area of the source storage device and copies data included in the host protected area of the source storage device to a host protected area of the target storage device.

38. The system as described in claim 37, wherein the duplicating machine determines a size of the host protected area of the source storage device and creates a host protected area on the target storage device of a size corresponding to the determined size of the host protected area of the source storage device.

39. The system as described in claim 38, wherein the size of the host protected area of the target storage device is suitable for at least one of including the host protected area of the source storage device, including the host protected area of the source storage device and at least a portion of a previously stored host protected area data of the target storage device.

40. The system as described in claim 38, wherein the duplicating machine creates a host protected area on the target storage device suitable for storing host protected area data from the source storage device.

41. The system as described in claim 38, wherein a previously stored host protected area of the target storage device is overwritten by the host protected area of the source storage device.

42. The system as described in claim 38, wherein the duplicating machine copies user accessible data from the source storage device to the target storage device, the user accessible data stored on a user accessible area of the target storage device.

43. The system as described in claim 38, wherein the duplicating machine detects a presence of a host protected area on the target storage device, and if a host protected area is present, resets the host protected area of the target storage device.

44. The system as described in claim 43, wherein the host protected area is detected utilizing a READ NATIVE MAX CYL command and the host protected area is reset utilizing a SET MAX CYL command.

45. The system as described in claim 38, wherein the presence of a host protected area is detected utilizing a READ NATIVE MAX CYL command.

46. An electronic data duplication system, comprising:
means for storing a source of electronic data, the source storage means including a means for protecting host data;
means for storing target storage electronic data; and
means for duplicating electronic data communicatively coupled to the source storage means and the target storage means, wherein the duplicating means detects the presence of the host data protection means of the source storage means and copies data included in the host data protection means of the source storage means to a host data protection means of the target storage means.

47. The system as described in claim 46, wherein the duplicating means determines a size of the host data protection means of the source storage means and creates a host data protection means on the target storage means of a size corresponding to the determined size of the host data protection means of the source storage means.

48. The system as described in claim 47, wherein the size of the host data protection means of the target storage means is suitable for at least one of including the host data protection means of the source storage device, including the host data protection means of the source storage device and at least a portion of a previously stored host data protection means data of the target storage device.

49. The system as described in claim 46, wherein the duplicating means creates a host data protection means on the target storage means suitable for storing host data protection means data from the source storage means.

50. The system as described in claim 46, wherein a previously stored host data protection means of the target storage means is overwritten by the host data protection means of the source storage means.

51. The system as described in claim 46, wherein the duplicating means copies user accessible data from the source storage means to the target storage means, the user accessible data stored on a user accessible area of the target storage means.

52. The system as described in claim 46, wherein the duplicating means detects a presence of a host data protection means on the target storage means, and if a host data protection means is present, resets the host data protection means of the target storage means.

53. The system as described in claim 52, wherein the host data protection means is detected utilizing a READ NATIVE MAX CYL command and the host data protection means is reset utilizing a SET MAX CYL command.

54. The system as described in claim 46, wherein the presence of a host data protection means is detected utilizing a READ NATIVE MAX CYL command.

* * * * *